United States Patent [19]

Parker

[11] 4,302,908
[45] Dec. 1, 1981

[54] LIVESTOCK DETAINING GATE

[75] Inventor: Donald D. Parker, Orem, Utah

[73] Assignee: Powder River Enterprises, Inc., Provo, Utah

[21] Appl. No.: 30,476

[22] Filed: Apr. 16, 1979

[51] Int. Cl.³ .................. E05C 7/06; E05F 17/00
[52] U.S. Cl. .................................. 49/122; 49/394; 119/98
[58] Field of Search ............... 49/394, 122, 109, 114; 119/98, 99, 147, 155

[56] References Cited

U.S. PATENT DOCUMENTS

| | | | |
|---|---|---|---|
| 200,430 | 2/1878 | Borgia | 49/114 |
| 339,459 | 4/1886 | Penfield | 49/110 |
| 1,843,820 | 2/1932 | Jackson | 49/394 X |
| 2,670,952 | 3/1954 | Bushell | 49/109 |
| 2,969,770 | 1/1961 | Collins | 49/394 X |
| 3,691,998 | 9/1972 | Luinstra | 119/98 |
| 3,814,060 | 6/1974 | Swenson | 119/98 |

Primary Examiner—Philip C. Kannan
Attorney, Agent, or Firm—K. S. Cornaby

[57] ABSTRACT

A livestock detaining gate preferably constructed of steel, having a gate latch system for locking gate panels into a closed position, and for permitting the panels to rotate into either a forward or rear open position. The latch system is preferably comprised of two cylindrical pipe sections suspended from parallel bars, which are also parallel to the upper edge of the closed gate panels, and are positioned slightly above said upper edge, with one cylinder to the front and one to the rear of the closed gate panels. An additional parallel rod is positioned slightly ahead of the forward cylinder, with another parallel rod positioned slightly behind the rear cylinder. The cylinder may swing inward upon contact with the closing gate panel top, allowing the gate panel to close. However, the extreme forward and rear rods prevent either cylinder from swinging outward, thus locking the gate panels in the closed position. A cantilever lift system is connected to the cylinder supporting rods. By rotating a rotating control rod, an operator may cause the cantilever lift system to raise the desired cylinder clear of the gate panel swing path, thus allowing the gate panels to be swung open in the desired direction.

5 Claims, 7 Drawing Figures

LIVESTOCK DETAINING GATE

BACKGROUND OF THE INVENTION

This invention relates to the field of livestock control gates, where the gate is used both as an entrance and exit, but also to essentially immobilize individual animals for milking, branding, application of medication, or similar purposes.

For many years devices have been known and in common usage for controlling and immobilizing livestock. However, prior to the present invention, none has provided a latching mechanism permitting use by a single individual.

The most common latch mechanism is comprised of two metal plates which slant downwardly and inwardly from a rotatable connection on the frame above the gate panels. These plates ride over the gate panel, then fall into locked position when the panel is closed.

Two types of latch/release controls are used with the above-described system. The first uses levered direct lift controls, utilizing a lift rod and fulcrum. This requires a separate lift rod for each of the plate latches. The second type of latch/release control utilizes a rotating shaft with a lift rod moving from each side of the rotating shaft.

It is a principal object of the present invention to provide a simple and reliable latch system as part of a livestock detaining gate with no springs or hinges required for the latch system.

SUMMARY OF THE INVENTION

This invention relates to a livestock detaining gate, and particularly to a latch mechanism and control on said gate for controlling the entrance and exit of livestock into a specified area, and/or immobilizing animals for milking, application of medication, or similar purposes.

A pair of gate panels are affixed to a frame preferably by attachment to rotatable vertical rods, which rods extend through the frame top and attach to a cantilever system and tension spring which coordinate gate panel movement and position.

The gate panels are locked into, or permitted to pass from, the closed position by a latch system comprising a pair of cylindrical pipe sections horizontally suspended from parallel bars, with a pair of additional parallel bars affixed respectively in front of one cylinder and behind the other cylinder. In this arrangement a cylinder will swing inward when contacted by the closing gate panels, allowing the panels to pass beneath it, but the additional parallel bars will prohibit the cylinders from swinging outward, thus locking the gate panels in a predetermined position.

The gate panels are permitted to pass from the closed position by raising the desired cylinder supporting rod and its cylinder above the top of the gate panels. This is accomplished by a cantilever lift means which connects to the support rod ends and lifts them in a lever and fulcrum manner. The cantilever lift means is connected at its other end to a rotatable control rod, which extends parallel to the gate frame top, and whose direction of rotation determines which cylinder is lifted. Arms extend vertically from each end of the control rod, preferably each arm end being provided with apertures for fastening a pull rope. This rope allows a single individual to rotate the control rod in the desired direction, lifting the cylinder and permitting the gate panels to move in either direction from the closed position.

The adjacent edges of the gate panels are shaped to comfortably embrace the animal's neck, while prohibiting passage of the head and shoulders when the gate panels are in the closed position. The extent of the distance between adjacent gate panel edges may be varied by sliding the panels outwardly or inwardly along their top supporting bar.

The maximum swing distance, and first open position of the gate panels is preferably determined by a position plate affixed atop one gate hinge rod.

THE DRAWINGS

A preferred embodiment of the invention is illustrated in the accompanying drawings, in which:

FIG. 1 is a front elevational view of the upper half of the livestock detaining gate, depicting it with the gate panels in the closed position and with an animal being detained therein;

FIG. 2, a top elevational view of the livestock detaining gate, depicting it with the gate panels in the closed position and with an animal being detained therein;

FIG. 3, a top sectional view of the livestock detaining gate taken along line 3—3 of FIG. 1, depicting a top plan view of the gate panel position control system, with the gate panels in the "initial" position;

FIG. 4, a top sectional view of the livestock detaining gate depicting a top plan view of the gate panel position control system, with the gate panels in the fully open position.

FIG. 5, a side sectional view of the livestock detaining gate taken along line 5—5 of FIG. 2, depicting a side elevational view of the latch/release control system, with the rear cylinder latch raised to allow the gate panels to return to the first position;

FIG. 6, a side sectional view of the livestock detaining gate depicting a side elevational view of the latch/release control system, with both cylinder latches lowered to restrain the gate panels in the closed position; and FIG. 7, a side sectional view of the livestock detaining gate as described in FIG. 5, depicting a side elevational view of the latch/release control system, with the forward cylinder latch raised to allow the gate panels to be opened to the fully open position.

DETAILED DESCRIPTION

Figure 1:
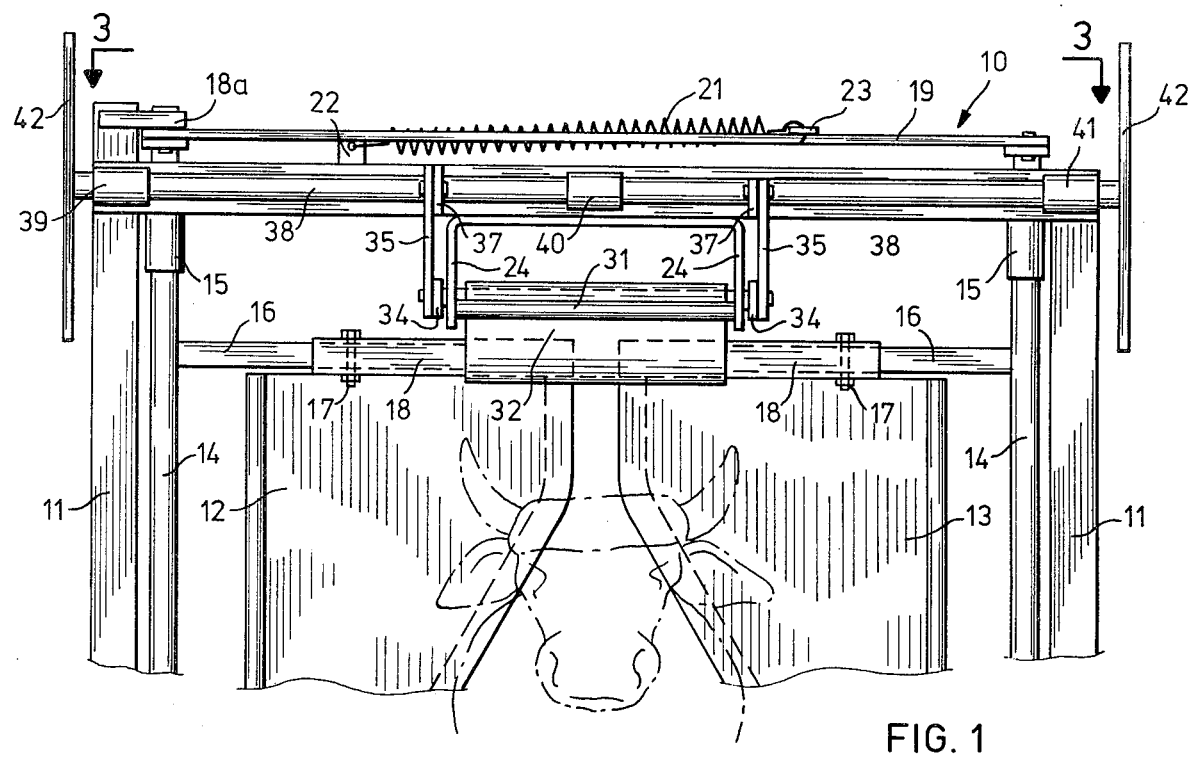

As shown in FIGS. 1 through 7, a preferred embodiment of the livestock detaining gate has a free standing rectangular frame 10 consisting of two parallel horizontal cross members 10a and 10b which are attached at either respective end to the front and to the rear of the tops of two parallel vertical members 11.

Two gate panels 12, 13 whose hinge members are mounted parallel to the vertical members 11 of the gate frame, and whose faces lie in the same plane when the gate is closed, with their forward edges lying adjacent and in close proximity to one another.

Hinge mounts 15 are affixed adjacent and parallel to vertical gate frame members 11, near their top and bottom. Said hinge mounts being cylindrical in shape, with interior diameter sufficient to permit insertion of the hinge member 14, and to permit free axial rotation of said hinge member without excess play or friction present.

Figure 2:
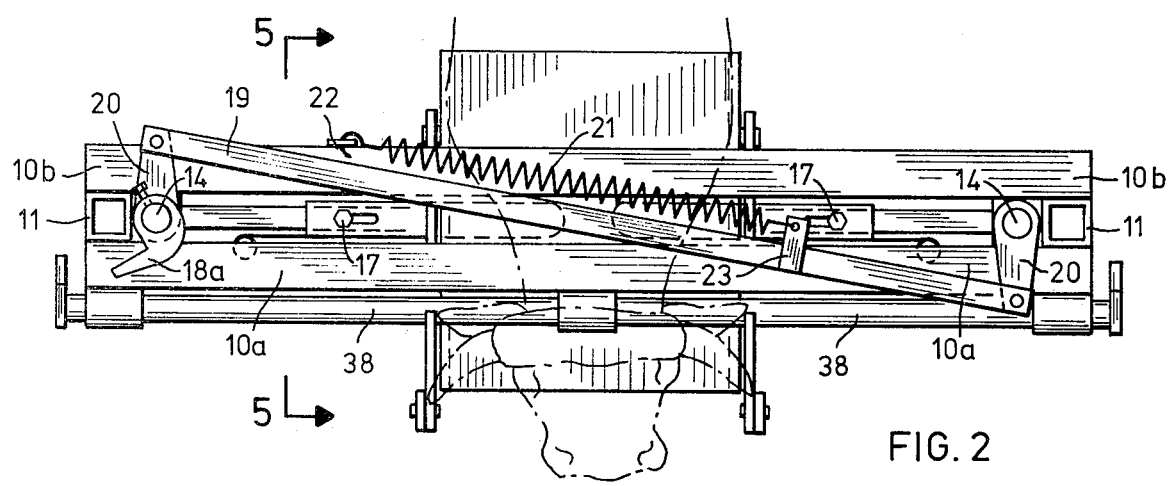
Figure 3:
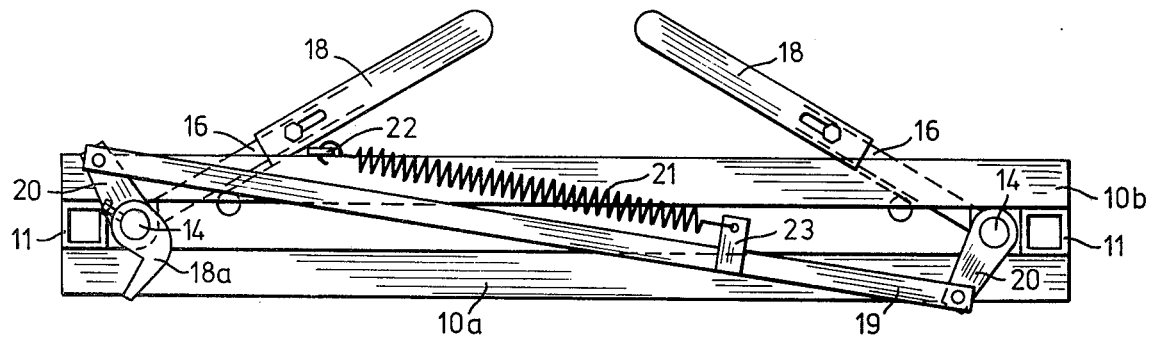
Figure 4:
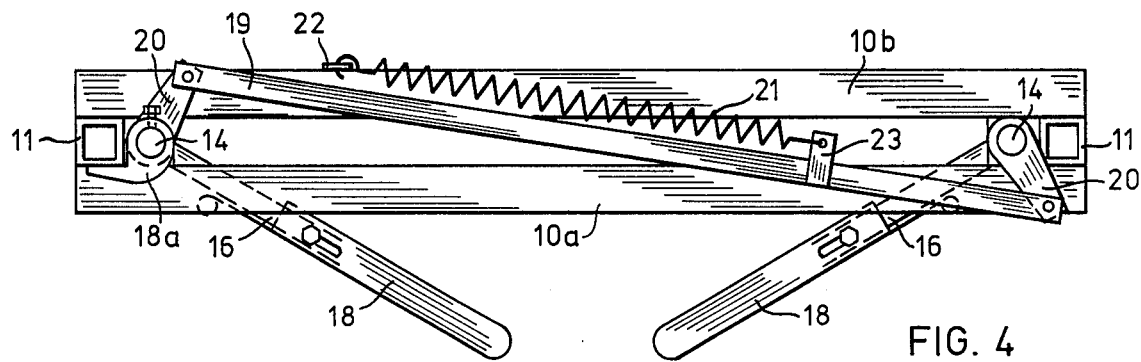

The gate panel forward edges are shaped so that in the closed position as illustrated in FIGS. 1 and 2, they comfortably embrace the animal's neck, while prohibiting passage of head and shoulders. The separation distance of the adjacent gate panels 12, 13 may be varied by moving the panels either forward or backward along the top panel supporting bar 16, FIG. 1. The panels are secured in the desired position of extension by a nut and bolt combination 17, which extends through aligned holes in the gate panel tubular top piece 18, and any pair of several correspondingly aligned holes contained in the top panel supporting bar 16.

Maximum and minimum gate panel swing positions are controlled by a position plate 18a, FIGS. 1-4, which is mounted atop one gate panel hinge member 14.

Swing coordination of the two gate panels is controlled by a gate swing position control system comprised of a connecting rod 19, FIGS. 1-4, with a rotating cantilever extension arm 20 affixed at either end. The extended ends of these extension arms 20 are rigidly affixed to the top portion of the vertical hinge member 14 nearest each of them, in such manner that when the gate panels 12, 13 are in the closed position, the extension arms 20 project in mutually opposite directions with respect to the center lines of horizontal gate frame members 10a and 10b. Tension is applied to the connecting rod 19 to hold or return the gate panels 12, 13 to their initial position. Said tension is derived from a tension spring 21 which is fastened at one end through an aperture in a plate 22 affixed to rear horizontal frame member 10b. The other end of tension spring 21 is fastened through an aperture in a plate 23 affixed to the top of connecting rod 19.

The gate panels 12, 13 are secured in, and freed from, the closed position by means of a gate securing mechanism. Said gate securing mechanism includes a frame 24, a rectangular top surface lying in the same plane as, and connected to, the bottom center surface of horizontal frame members 10a and 10b. The front and rear of the frame 24 extends somewhat beyond the forward and rear most edges of horizontal frame members 10a and 10b, and the width of frame 24 occupies approximately the center third of the distance between gate panel hinge members 14. From the frame 24 top member, side panels extend downwardly on each of the two sides which face the vertical gate frame support members 11.

The two side panels of frame 24 are aligned adjacently, with their faces lying in parallel vertical planes. Each side panel contains two vertical slots 25, 26, one slot 25 in the front third of the panel, and a similar one slot 26 in the rear third of the panel, which slots are aligned with the corresponding front or rear slot of the adjacent side panel. A latch cylinder support rod 27, FIGS. 5-7, extends through the adjacent forward slots 25, as does a similar support rod 28, through the adjacent rear slots 26.

Figure 5:
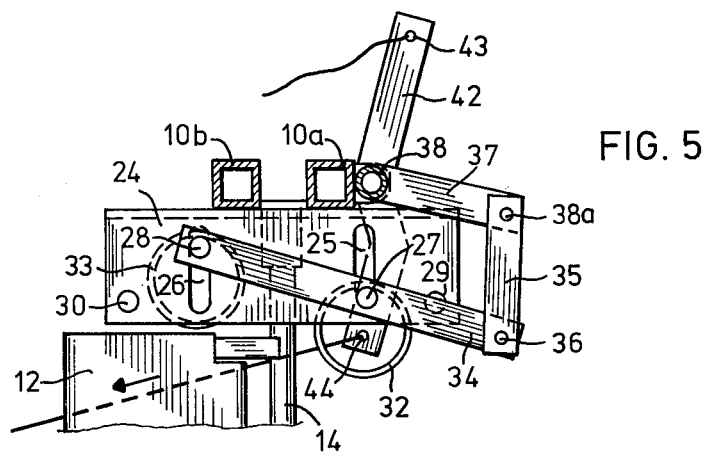
Figure 6:
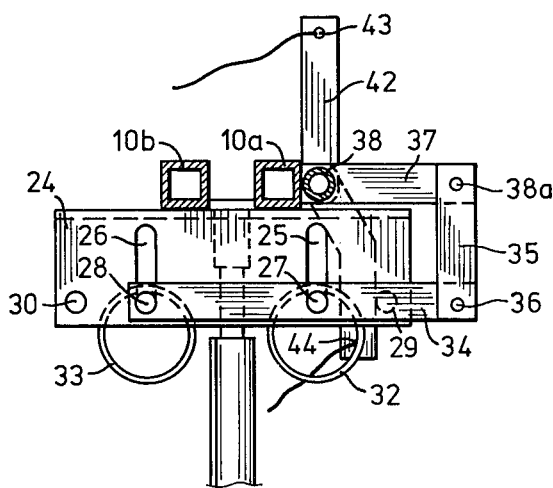
Figure 7:
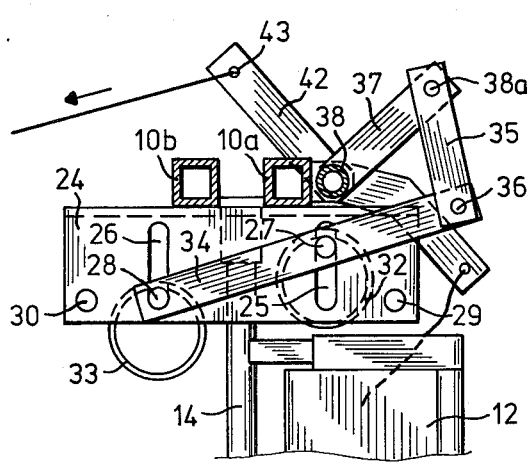

A circular aperture 29, FIGS. 5-7, is contained in the lower front section of each side panel, and a similar aperture 30, is present in the lower rear section of each side panel. Circular apertures 29 and 30 are aligned with the corresponding aperture in the front or rear of the adjacent side panel. A latch stop rod 31, FIG. 1, extends through adjacent forward side panel holes 29, FIGS. 5-7, and is permanently affixed there. An additional latch stop rod is similarly affixed through adjacent rear side panel aperture 30.

A cylinder 32, the length of which is slightly less than the interior distance between the gate securing mechanism frame's adjacent side panels, and having an exterior radius slightly less than the horizontal distance from slot 25 center to the near edge of aperture 29, is suspended from the frame 24 by extending cylinder support rod 27 through its open longitudinal center section. A similar cylinder 33, FIGS. 5-7, is suspended in like manner from cylinder support rod 28.

When cylinder support rods 27 and 28 are resting at the bottoms of slots 25 and 26, door panels 12 may swing into the closed position. However, from this position an attempt to swing door panels 12 forward by force is prevented since the force of door panels 12 contacts cylinder 32 swinging it forward until it contacts latch stop rod 31 which prohibits further forward cylinder motion, causing the cylinder to block gate panel opening. The same result will occur with rear pressure by gate panels 12 contacting cylinder 33 and latch stop rod affixed through aperture 30.

Gate panels 12 are allowed to leave the closed position by raising the desired cylinder support rod 27 or 28 in its corresponding slot 25 or 26, which elevates its suspended cylinder 32 or 33 above the top of gate panels 12, 13 and permits the opening of the gate panels 12, 13.

The cylinder support rods 27 and 28 are raised in their corresponding slots 25 and 26 by means of an operator-controlled cantilever lift system. This system includes two lower arms 34, with each one mounted opposite the other, lying flush against the exterior surface of the frame 24 side panels. Each arm 34 contains two circular apertures, one near the rear end, and the other near the center, which apertures align with side panel slots 25 and 26. Cylinder support rods 27 and 28 are extended through the lower arm holes, and are secured in that position. The lower arms 34 extend several inches beyond the forward edge of horizontal support frame 10a.

The forward ends of the lower arms 34 are rotatably connected to the bottom ends of corresponding vertical arms 35, by a nut and bolt combination, where the nut extends through aligned circular apertures 36 in the adjacent ends of the lower 34 and vertical 35 arms.

The top ends of the vertical arms 35 are rotatably connected to the forward ends of corresponding upper arms 37 by a nut and bolt combination, where the nut extends through aligned circular apertures 38a in the adjacent ends of the vertical 35 and upper 37 arms.

The two upper arms 27 are permanently affixed to the lock/release control bar 38 at their rear ends in such manner that when the control bar 38 is in the locked position, the upper arms 37 extend forward, each parallel to and aligned with its corresponding lower arm 35.

The lock/release control bar 38 lies directly forward of, and parallel to, horizontal support member 10a. The lock/release control bar 38 is extended through, and held in its rotatable position by three cylindrical collars 39, 40 and 41 whose interior diameter is just slightly greater than the exterior diameter of the lock/release control bar 38. Cylindrical collars 39 and 41 lie parallel to horizontal support member 10a, and are permanently affixed at opposite ends of the front side of said horizontal support member 10a. Cylindrical collar 40 lies parallel to horizontal support member 10a, and is permanently affixed to the center of the front side of this member.

On each end of the lock/release control bar 38 is affixed a vertical extension 42, which extends both upward and downward from the control bar 38. Near the top end of each vertical extension is an aperture 43 through which a pull rope may be fastened. Likewise, near the bottom end of each vertical extension is an aperture 44 through which a second pull rope may be fastened.

If the operator is standing forward of the gate, a pull on the upper rope, in aperture 43, will operate the cantilever lift system and raise the rear latch cylinder 33, permitting the gate panels 12 to return to their initial position. A pull on the lower rope, in aperture 44, will operate the cantilever lift system and raise the forward latch cylinder 32, permitting the gate panels 12 to be swung to their fall forward position.

If the operator is standing behind the gate, a pull on the upper rope in aperture 43, will result in lifting of forward cylinder latch 32, with results as described above. Likewise, a pull on the lower rope, in aperture 44, will result in the lifting of rear cylinder latch 33, with results as described above.

Although a preferred embodiment of the invention has been herein disclosed, it is to be understood that the present disclosure is made by way of example and that variations are possible without departing from the subject matter coming within the scope of the following claims, which subject matter is regarded as the invention.

I claim:

1. A livestock detaining gate for controlling movement of livestock, comprising in combination:
    a gate frame comprising a top and two vertical side members;
    a pair of gate panels, mounted respectively on each of horizontally spaced parallel hingedly mounted vertical rod members of said gate frame;
    a pair of parallel cross support members, each being attached at either end respectively to each side of the top ends of said gate frame;
    biased cantilever means connecting upper edges of said gate panels for controlling the swing and position of said gate panels;
    a rotatable control bar attached to said frame in a position parallel to the front edge of said cross support members, having vertical arm extensions affixed at respective ends of said bar;
    a support frame the base of which comprises a rectangular surface having its upper face affixed to the bottom side of said parallel cross support members, and having a pair of support panels extending vertically downwardly on each of the two respective sides of said support frame;
    a pair of latch stop rods, one rod being perpendicularly connected to the inside lower front portions of said support panels, and the other rod similarly connected to the lower back portions of said support panels, in parallel relationship to each other;
    a pair of cylinder support rods in parallel relationship to each other and to said pair of latch stop rods, and extending through vertical slots in the front and rear portions of said support panels, with said slot in one panel being aligned with the corresponding slot in the respective portion of the opposite support panel;
    cantilever lift means being connected to said control bar, and responding to rotation of said control bar by lifting one of a pair of cylinder latches respectively mounted on said cylinder support rods thereby permitting said gate panels to swing in a predetermined direction; and
    a pair cylinder latches, each consisting of a cylinder suspended horizontally from each of said pair of cylinder support rods said cylinders being of a circumference such that when said control bar is in the closed position, pressure against said gate panels forces said cylinder against said latch stop rod, preventing said gate panels from opening and when said control bar is in the open position, said cylinder is raised above said gate panels, permitting said panel to swing open in the direction of the raised cylinder; and
    position limiting means on one of said vertical rod members for limiting the distance which said gate panels open.

2. A livestock detaining gate as set forth in claim 1, wherein said cantilever lift means comprises in combination:
    a pair of lower arms mounted on opposite sides of said support panels, each being disposed against the exterior surface of said support panels, with the respective ends of said support rods rotatably secured through apertures aligning with said slots of said support panels;
    a pair of vertical arms, each being rotatably connected at its bottom end to the respective extended end of said lower arms; and
    a pair of extended arms permanently affixed to said control bar in such manner that when said control bar is in the closed position, said arms extend outwardly, each being parallel to, and aligned with one of said corresponding lower arms, and each being rotatably connected at its extended end to the top end of the corresponding vertical arm.

3. A livestock detaining gate as set forth in claim 1, wherein all structural and operating portions, are constructed of steel.

4. A livestock detaining gate as set forth in claim 1, wherein the adjacent edges of the two gate panels are shaped in such fashion that when the panels are in closed position, an aperture is created around the neck of an animal the size of which prevents passage of the head or shoulder.

5. A livestock detaining gate as set forth in claim 1, wherein the separation distance between the adjacent closed gate panels can be varied to accommodate various sizes of livestock by extending or retracting the panels along their supporting members.

* * * * *